(12) United States Patent
Alagha et al.

(10) Patent No.: US 11,101,878 B2
(45) Date of Patent: Aug. 24, 2021

(54) SIGNAL OVERLAY DESIGN AND DETECTION FOR SATELLITE COMMUNICATION CHANNELS

(71) Applicants: European Space Agency, Paris (FR); Politecnico di Torino, Turin (IT)

(72) Inventors: Nader Alagha, Wassenaar (NL); Farbod Kayhan, Luxembourg (LU); Guido Montorsi, Turin (IT)

(73) Assignees: European Space Agency, Paris (FR); Politecnico Di Torino, Turin (IT)

( * ) Notice: Subject to any disclaimer, the term of this patent is extended or adjusted under 35 U.S.C. 154(b) by 0 days.

(21) Appl. No.: 16/754,616

(22) PCT Filed: Oct. 8, 2018

(86) PCT No.: PCT/IB2018/057775
§ 371 (c)(1),
(2) Date: Apr. 8, 2020

(87) PCT Pub. No.: WO2019/073354
PCT Pub. Date: Apr. 18, 2019

(65) Prior Publication Data
US 2020/0358521 A1 Nov. 12, 2020

(30) Foreign Application Priority Data
Oct. 9, 2017 (IT) .......................... 102017000113326

(51) Int. Cl.
*H04B 7/185* (2006.01)
*H04J 11/00* (2006.01)

(52) U.S. Cl.
CPC ........ *H04B 7/18513* (2013.01); *H04J 11/004* (2013.01)

(58) Field of Classification Search
CPC .......................... H04B 7/18513; H04J 11/004
See application file for complete search history.

(56) References Cited

U.S. PATENT DOCUMENTS

2015/0146546 A1* 5/2015 Kant .................... H04B 7/0413
370/252
2020/0077375 A1* 3/2020 Stathakis .............. H04L 5/0007

OTHER PUBLICATIONS

International Search Report and Written Opinion dated Jan. 22, 2019, issued in PCT Application No. PCT/IB2018/057775, filed Oct. 8, 2018.
Farbod Kayhan et al., *Comparative Assessment of Orthogonal and Nonorthogonal Multiplexing Techniques for Differentiated Satellite Broadcasting Services*, 2015 IEEE Symposium on Communications and Vehicular Technology in the Benelux, Nov. 24, 2015, pp. 106, XP032845399.

(Continued)

*Primary Examiner* — Samina F Choudhry
(74) *Attorney, Agent, or Firm* — Workman Nydegger

(57) ABSTRACT

A method for design an optimized constellation set and labeling for satellite point to multi-point transmission systems including transmitters and receivers, wherein the transmitters are adapted to create signals overlay and are configured to allow simultaneous transmission of at least two different data streams (services) intended for users with different radio link qualities. In particular, N services are provided to users having a good radio link and a subset of services is maintained and guaranteed for the users having a lower radio link quality condition.

11 Claims, 13 Drawing Sheets

(56) References Cited

OTHER PUBLICATIONS

Aharon Vargas et al., *Design and Evaluation of a Multilevel Decoder for Satellite Communications*, Communications, Jun. 14, 2009, pp. 1-6, XP031505873.
Guido Montorsi, *Design of Constellation Sets for Multistage Systems*, 2016 IEEE Global Communications Conference, Dec. 4, 2016, pp. 1-6, XP033058457.
Peter Adam Hoeher et al., *DVB Organization: Superposition Modulation: Myths and Facts*, Jun. 9, 2014, XP017844657.
Thomas M. Cover, *Comments on Broadcast Channels*, IEEE Transactions on Information Theory, vol. 44, No. 6, Oct. 1998, pp. 2524-2530.
"Digital Video Broadcasting (DVB); Second generation framing structure, channel coding and modulation systems for Broadcasting, Interactive Services, News Gathering and other broadband satellite applications; Part II (DVB-S2X)" ETSI EN 302 307-2.
International Preliminary Report on Patentability dated Apr. 14, 2020, issued in PCT Application No. PCT/IB2018/057775, filed Oct. 8, 2018.

* cited by examiner

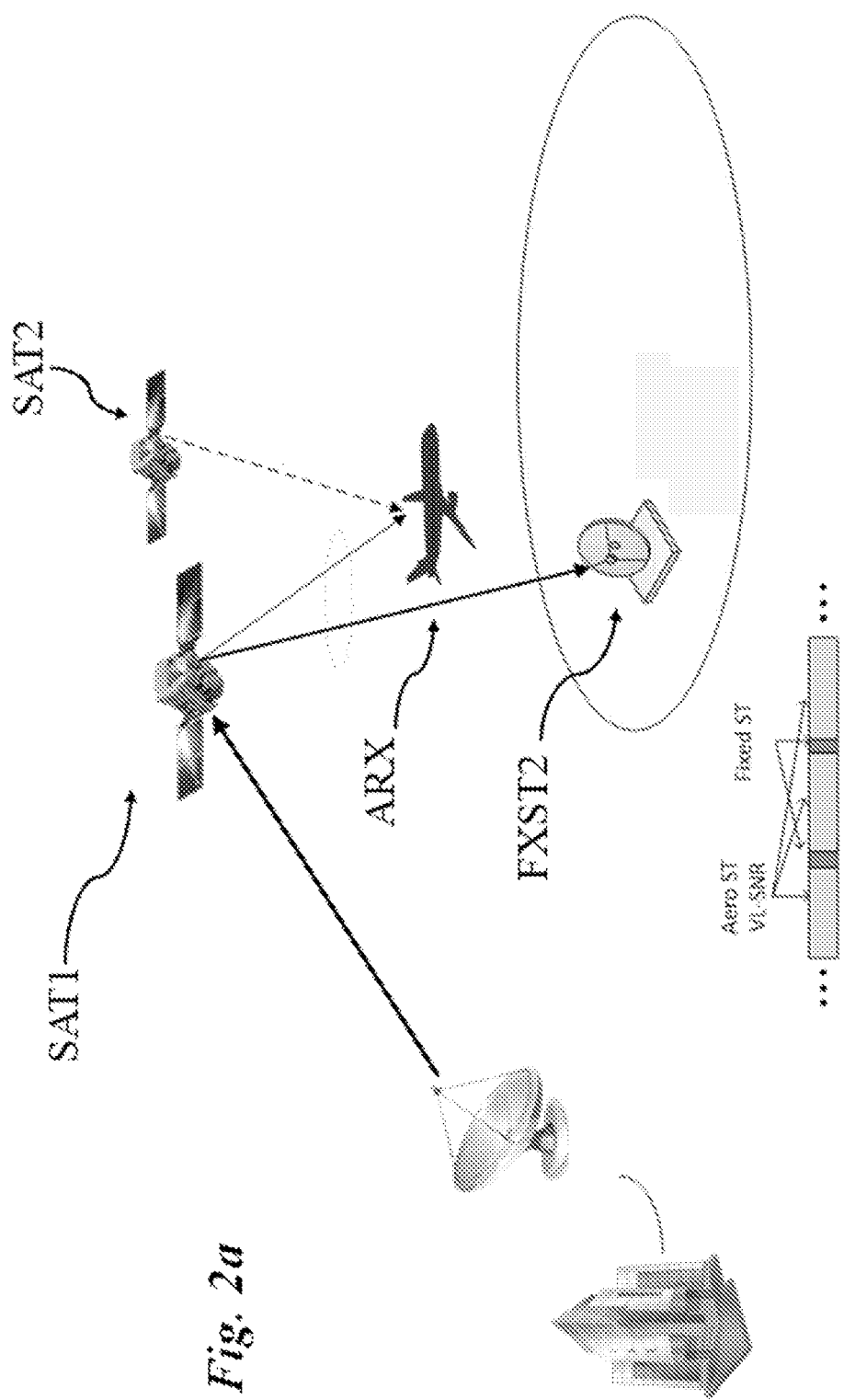

SIGNAL OVERLAY DESIGN AND DETECTION FOR SATELLITE COMMUNICATION CHANNELS

FIELD OF THE INVENTION

The present invention is related to the field of signal transmission design for satellite broadcast channels where transmitted signal from satellite is received by multiple receivers.

The invention is also related to the signal constellation design for satellite broadcasting channels with multiple receivers experiencing different satellite link quality.

In particular, a method for signal overlay design and detection for satellite broadcasting (multiple receivers) channels is disclosed.

Unlike the conventional transmission solutions for satellite broadcasting channels based on multiplexing (time-sharing) of satellite resources, the signal overlay solution allows to transmit information to two or more users simultaneously.

Although the theoretical results for signal overlay is well known in the literature for additive white Gaussian channel with an average power limit (T. M. Cover, "Broadcast channels," IEEE Trans. Inf. Theory, vol. 18, no. 1, pp. 2-14, January 1972.), the actual realization of such technique for satellite channels with peak power limitation is not commonly discussed or analysed.

Compared to the multiplexing approach (time sharing), the signal overlay can offer a considerable gain in the total data throughput delivered to multiple users. Compared to that of the conventional time sharing, the gain is particularly significant when the link quality of between two (or more classes) of receivers is highly imbalance.

Description of Prior Art

The use of orthogonal signal multiplexing, such as time division multiplexing (TDM), is commonly used for serving traffic to multiple users in the satellite forward link direction from the gateway to satellite user terminals (or from the transmitting satellite to satellite user terminals).

In the existing forward link of the broadband satellite systems, that by nature serves multiple receivers (hence, is a broadcasting channel) the link quality variations among users (due to different characteristics of the receiving user terminals or temporal atmospheric fading) are compensated for by adjusting the physical layer coding and modulation per each user to ensure individual link availability.

This is referred to as Adaptive Coding and Modulation (ACM) in conjunction with the TDM (Time Division Multiplexing) signal construction, and is disclosed, for example in "Digital Video Broadcasting (DVB); Second generation framing structure, channel coding and modulation systems for Broadcasting, Interactive Services, News Gathering and other broadband satellite applications; Part II (DVB-S2X)" ETSI EN 302 307-2. The spectral efficiency of each link depends on the link quality.

The DVB-S2X standard in particular has extended the range of supported coded and modulation to cover signal to noise quality thresholds from −10 dB to 20 dB.

The high-end SNR range ensures the spectral efficiency for professional services while the very low SNR (VL-SNR) range allows the co-existence of small and mobile terminals on the same signal stream TDM as the higher SNR broadband and professional services. The coexistence of services on the same multiplex is essential for the mobile services, allowing faster service uptake and economic viability.

SUMMARY OF THE INVENTION

The present invention aims at solving these and other problems by providing a method according to claim 1.

In this disclosure, a practical signal constellation design for signal transmission as well as a detection method at the receiver is described to achieve the gain of overlay signal, particularly for satellite channel with average power as well as peak power constraints.

The performance gain of overlay signalling is particularly significant when the overlay signals are intended for users with a large difference in their link efficiencies. This is particularly important in the system applications where two distinct classes of user terminals are deployed such as fixed satellite services in coexistence with aeronautical or vehicular communications.

BRIEF DESCRIPTION OF DRAWING

The characteristics and other advantages of the present invention will become apparent from the description of an embodiment illustrated in the appended drawings, provided purely by way of non-limiting example, in which:

FIGS. 1a and 1b and FIGS. 2a and 2b show two different system scenarios,

DETAILED DESCRIPTION OF THE INVENTION

In this description, any reference to "an embodiment" will indicate that a particular configuration, structure or feature described in regard to the implementation of the invention is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for simplicity's sake, and do not limit the protection scope or extension of the various embodiments.

As it has been disclosed, the theoretical results for AWGN channel, as disclosed in T. M. Cover, "Broadcast channels," IEEE Trans. Inf. Theory, vol. 18, no. 1, pp. 2-14, January 1972, as well as recent investigation for peak power limited channel have shown system scenarios where non-orthogonal signal multiplexing (signal overlay) can outperform orthogonal multiplexing, such as TDM.

This is particularly the case when there is a large difference between the user terminals link qualities (for example due to the different receiving antenna gains).

For users with poor link quality, the impact of the overlay signal in the received Signal to interference plus noise power ratio is negligible (slightly worse) and the receiver structure remains the same as TDM solution.

For the users with higher link quality, the interference caused by overlaying signal can be removed and a higher spectral efficiency can be reached at the expense of relatively more baseband receiver complexity.

In different embodiments, since both set of users have access to the resources at the same time there is no delay jitter or scheduling complexity at the transmitter.

This concept is demonstrated by two examples comparing theoretical results of:

(a) adaptive coding and modulation (ACM) together with orthogonal multiplexing, and
(b) signal overlay.

In the following, there were disclosed different examples and scenarios.

Figures 1A, 1B:
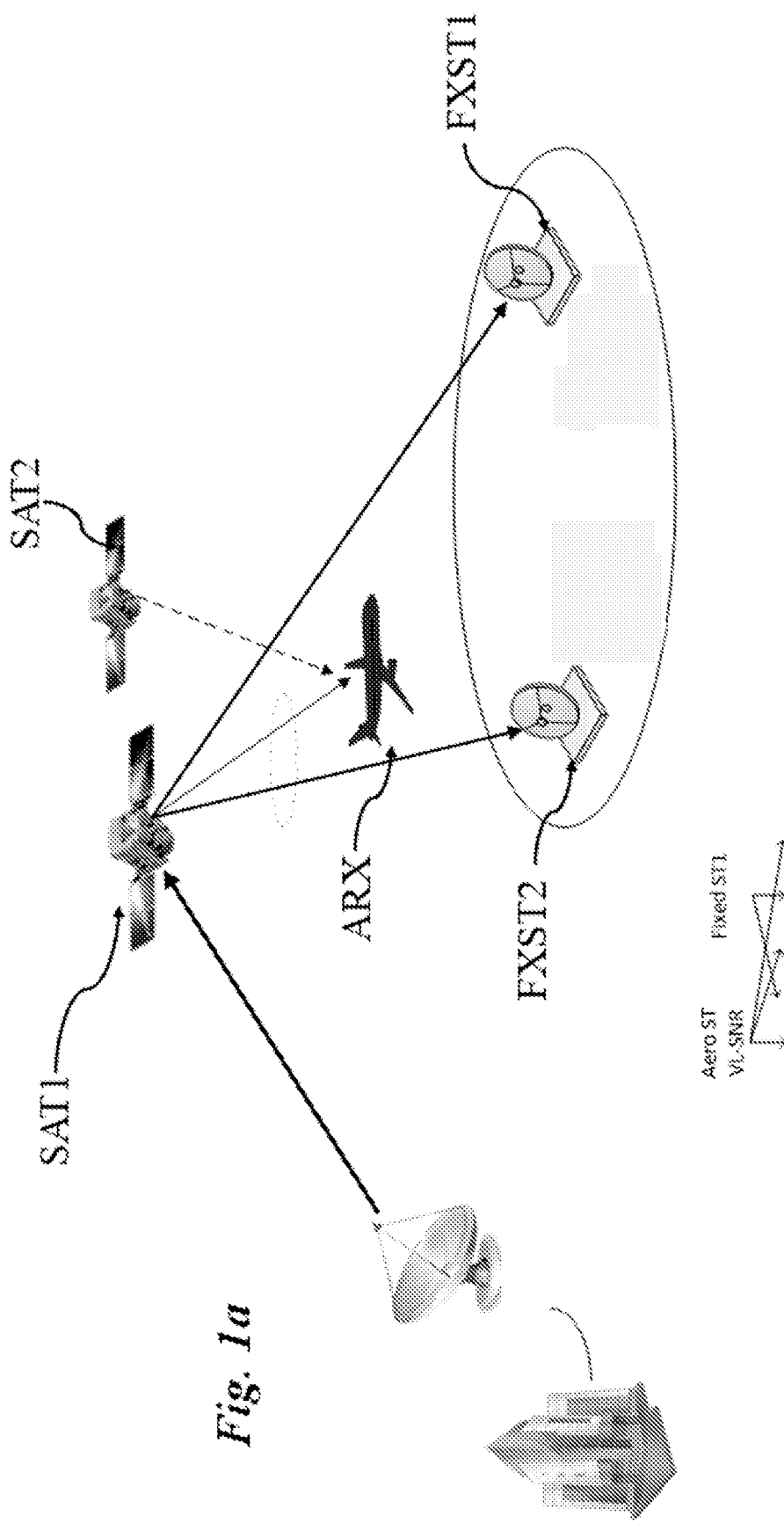

With reference to FIG. 1a a first example of an embodiment is disclosed. In particular in this scenario there were aeronautical and fixed satellite services.

In this example, a realistic system scenario a Ku-band transponder is deployed to serve two classes of users:
1) aeronautical user terminals with a constraint on the antenna size (effective antenna size 30 cm), and
2) fixed satellite user terminals with 1,2 meters antenna size.

FIG. 1a shows the system scenario in which both aeronautical and fixed satellite services are served by the same forward link carrier.

There is around $20*\log_{10}(1,2/0,3)=12$ dB difference between the signal to noise ratio observed by the two classes of the satellites.

Furthermore, in this embodiment the aeronautical terminal is more susceptible to adjacent satellite interference due to less directivity of the antenna.

In particular, in this exemplary embodiment the system scenario comprises two geo-stationary satellites, namely SAT1 and SAT2, an aero ST VLSNR receiver ARX and two Fixed station, namely a fixed station with a conventional receiver FXST1 and a fixed station with an advanced receiver FXST2. The first satellite SAT1 broadcasts the overlay signal, and the adjacent satellite SAT2 broadcasts the co-channel interference signal.

FIG. 1b shows the percentage of time for the different services. In the classical benchmark multiple solution, the two services AeroST VL-SNR and Fixed ST1 are equally distributed.

In the proposed overlay multiplex solution, the two services AeroST+Fixed ST2 overlay signal and Fixed ST1 solutions are differently distributed (i.e. AeroST+Fixed ST2 overlay signal has a higher percentage of use).

Table 1 summarizes the key system assumptions for two system solutions; one based on conventional ACM and time sharing and the second solution that uses similar time-sharing structure as solution one but replaces the VL-SNR modulation and coding with an overlay signal that is detected by aeronautical receiver as well as the receiver with interference cancellation capability.

The frame structure is shown as already disclosed in FIG. 1b.

TABLE 1

| No. | Parameter | Unit | ACM + Time-Sharing | Signal Overlay + Time-Sharing | Comment |
|---|---|---|---|---|---|
| 1 | Transponder Bandwidth | MHz | 36 | 36 | A Ku-band transponder is considered |
| 2 | Typical Link Quality for fixed satellite services (C/N + I) | dB | 9 | 9 | The Link quality for fixed user terminal corresponds to 1.2 m dish size (G/T~21 dB/K) and satellite EIRP of 41 dBW per transponder. The transponder bandwidth of 36 MHz is considered. Note that for fixed satellite terminals the co-channel interference due to the adjacent satellites is considered negligible. |
| 3 | Average percentage of time serving fixed user terminals (conventional receivers) | % | 50 | 45 | For both system solutions, a high percentage of the time multiplex is reserved for fixed satellite terminals. |
| 4 | Power allocation to Aero service for overlay signal | % | — | 90 | The overlay signal consists of two terms one decodable by Aero terminals with 90% of the signal power. The remaining power (10%) is used for the second layer that is only detectable and decodable by advanced fixed receivers. |
| 5 | SNR for Aero Terminal | dB | −3 | −3.5 | 12 dB lower SNR compared to that of fixed satellite terminal. The C/N reduction of the overlay signal is due to power split between two signal layers. |

TABLE 1-continued

| No. | Parameter | Unit | ACM + Time-Sharing | Signal Overlay + Time-Sharing | Comment |
|---|---|---|---|---|---|
| 6 | Signal to Interference ratio (C/I) for Aero Terminal | dB | 0 | 0 | Due to the small size of the antenna, the adjacent satellite co-channel interference is present. The antenna has a wide beam and two adjacent satellites contribute to co-channel interference. |
| 7 | Total C(N + I) for Aero Terminal | dB | −4.8 | −5.25 | Taking into account both C/N and C/I as shown in previous lines. |
| 8 | Theoretical aggregate fixed user terminal throughput | Mbits/s | 56.9 | 51.2 | Theoretical capacity as a function of total bandwidth and SNIR. Considering the percentage of time allocated to the service. |
| 9 | Theoretical aggregate Aero terminal throughput | Mbits/s | 7.43 | 7.46 | Both solutions offer the same throughput to Aero terminals |
| 10 | Theoretical throughput of advanced fixed receivers | Mbits/s | — | 16.7 | Additional capacity that is only achievable using signal overlay technique |

In Table 1 there are listed the different parameters and the two solutions are compared. In the last column, there is the comment on the comparison between the AMC+Time Sharing solution and the Signal Overlay+Time Sharing solution.

In particular it is possible to highlights that, as shown in Table 1, both system solutions are capable of serving Aeronautical and Fixed satellite terminals.

In this embodiment, the transponder resources are shared between these two services.

In the conventional ACM & time-sharing approach (shown also in FIG. 1b as the benchmark multiplexing solution), the transponder time is equally shared between the two services.

The corresponding maximum throughput for Fixed and Aero services are computed as 56,9 and 7,43 Mbits/s respectively.

In vary embodiments, the proposed overlay multiplexing solution, for the sake of backward compatibility, the same conventional Fixed and Aero services are offered to the existing population of users (no change in the receivers are therefore required).

In addition, a new class of fixed satellite terminals FXST2 are deployed that can decode and remove the Aero signal from an overlay signal and detect the second layer that is targeted for FXST2 terminals.

In this exemplary embodiment, the time-share between services (for the benchmark solution) and the power allocation (for the signal overlay solution) are adjusted such that the Aero terminals receive the same throughput for both benchmark and overlay solutions (~7,45 Mbits/s).

In the overlay solution, the overall throughput of the Fixed terminals is increased to 51,2+16,7=67,9 Mbits/s that is around 20% of increase in the throughput for the Fixed terminals while maintaining the same throughput for Aero terminals.

In addition, in this embodiment the existing Fixed terminals can still be served by the TDM (with a slightly lower throughput).

It should be noted that the same Aero terminals are used for both system solutions.

In the proposed overlay signal solution, a more protected modulation and coding is required (still within the range of VL-SNR solutions offered by DVB-S2X) to serve the Aero terminals due to the power split between two layers.

For the Fixed satellite terminals, the co-channel interference due to the adjacent satellites is considered negligible.

The C/N reduction of the overlay signal is due to power split between two signal layers. Due to the small size of the antenna, in this embodiment the adjacent satellite co-channel interference is present. The antenna has a wide beam and two adjacent satellites contribute to co-channel interference.

Additional capacity that is only achievable using signal overlay technique are achieved for the advanced Fixed receivers.

With reference to FIG. 2a a second example is disclosed.

In particular, in this scenario Continuous Aero Service are offered.

In this example, it is assumed that all the fixed terminals are capable of overlay signal detection and decoding (corresponding to FXST2 in the first Example shown in FIG. 1a).

As a result, in this embodiment the transponder resources can be shared between Aero terminal and the FXST2 terminals all the time).

In this example, the overlay signal is designed to deliver service to Aero terminal continuously (no time sharing) as the primary service.

In addition, in this embodiment the advanced receiver with a higher link quality reception (larger antenna) can detect and remove the first layer of signal, then decode a second layer. Table 2 provides a summary of the (theoretical) results for this scenario.

Considering 90% of the power of the transponder being allocated to the Aero services in overlay signal, the aggregate throughput of the Aero services reaches 13,6 Mbits/s. In addition, the 10% of the power of the transponder is used to deliver 30,4 Mbits/s throughputs to high gain terminals.

TABLE 2

| No. | Parameter | Unit | ACM (Benchmark) | Signal Overlay | Comment |
|---|---|---|---|---|---|
| 1 | Transponder Bandwidth | MHz | 36 | 36 | A Ku-band transponder is considered |
| 2 | Typical Link Quality for fixed satellite services (C/N + I) | dB | 9 | 9 | The Link quality for fixed user terminal corresponds to 1.2 m dish size (G/T~21 dB/K) and satellite EIRP of 41 dBW per transponder. The transponder bandwidth of 36 MHz is considered. Note that for fixed satellite terminals the co-channel interference due to the adjacent satellites is considered negligible. |
| 3 | Average percentage of time serving fixed user terminals (conventional receivers) | % | 8.5 | 0 | For both system solutions, a high percentage of the time multiplex is reserved for fixed satellite terminals. |
| 4 | Power allocation to Aero service for overlay signal | % | — | 90 | The overlay signal consists of two terms one decodable by Aero terminals with 90% of the signal power. The remaining power (10%) is used for the second layer that is only detectable and decodable by advanced fixed receivers. |
| 5 | SNR for Aero Terminal | dB | −3 | −3.5 | 12 dB lower SNR compared to that of fixed satellite terminal. The C/N reduction of the overlay signal is due to power split between two signal layers. |
| 6 | Signal to Interference ratio (C/I) for Aero Terminal | dB | 0 | 0 | Due to the small size of the antenna, the adjacent satellite co-channel interference is present. The antenna has a wide beam and two adjacent satellites contribute to co-channel interference. |
| 7 | Total C(N + I) for Aero Terminal | dB | −4.8 | −5.25 | Taking into account both C/N and C/I as shown in previous lines. |
| 8 | Theoretical aggregate fixed user terminal throughput | Mbits/s | 9.7 | 0 | Theoretical capacity as a function of total bandwidth and SNIR. Considering the percentage of time allocated to the service. |
| 9 | Theoretical aggregate Aero terminal throughput | Mbits/s | 13.6 | 13.6 | Both solutions offer the same throughput to Aero terminals |
| 10 | Theoretical throughput of advanced fixed receivers | Mbits/s | 0 | 30.4 | Additional capacity that is only achievable using signal overlay technique. This is significantly higher than the throughput that can be obtained by ACM solution shown in the Row 8 above (30.4 Mbit/s vs. 9.7 Mbits/s) |

For comparison, Table 2 also includes the same analysis for ACM (with time sharing) solution.

In this embodiment, it is shown that for the same Aero service throughput of 13,6 Mbits/s, the ACM solution can only deliver 9,7 Mbits/s of fixed satellite service by utilizing 8,5% of the Time-sharing multiplex.

This example shows that the signal overlay solution in this embodiment can deliver 30,4/9,7=3,1 times higher throughput to high gain terminals.

It is also important to note that compared to ACM with time-sharing, the signal overlay transmission scheme does not introduce time jitter in bit delivery to high gain user terminals. The ACM solution in this example only occupies 8,5% of the transmission time for high gain terminals as shown in FIG. 2b.

It has to be noted that, in this embodiment for Fixed satellite terminals the co-channel interference due to the adjacent satellites is considered negligible (due to a larger receiver antenna size).

For both system solutions, a high percentage of the time multiplex is reserved for aero satellite terminals. Due to inefficiency, the aero terminal needs more time.

In this embodiment, the C/N reduction of the overlay signal is due to power split between two signal layers.

The overlay signal constellation design at the transmitter and detection technique at the receiver is disclosed in order to realize the potential gain of the overlay signalling, particularly for application scenarios examples described in previous section.

Similar constellation design techniques are here disclosed. But, in this case is for a different application, i.e. to send unicast traffic to users (as opposed to broadcast application).

Here the proposed non-orthogonal TX techniques are disclosed.

All the techniques used for achieving the capacity regions of the degraded broadcast channel are based on the superposition of layers or services.

Some authors focus on the design of hierarchical constellations while others focus on the design of the complete coding and modulation system.

The proposed approach in this disclosure follows this second strategy, as it is believed that a joint coding and modulation scheme, coupled with a suitable suboptimal iterative receiver is necessary to obtain performances close to the theory.

The general approach based on the Hierarchical Modulation will now be described. The block diagram of the first and more general N considered encoding and Hierarchical Modulation (HM) scheme is reported in FIG. 3.

The set of N services are encoded by using independent powerful (turbo-like) binary codes $ENC_i$ with code rates $r_i$, generating the sequence of coded bits $c_i$ that are interleaved $INT_i$ generating $m_i$ and sent to the mapper MAP.

The encoded bits $c_i$ independently generated for the services are grouped into blocks of $m_i$ bits and mapped to a constellation set of cardinality $M=2^m$ with $$m = \sum_{i=1}^{N} m_i$$

Figure 3:
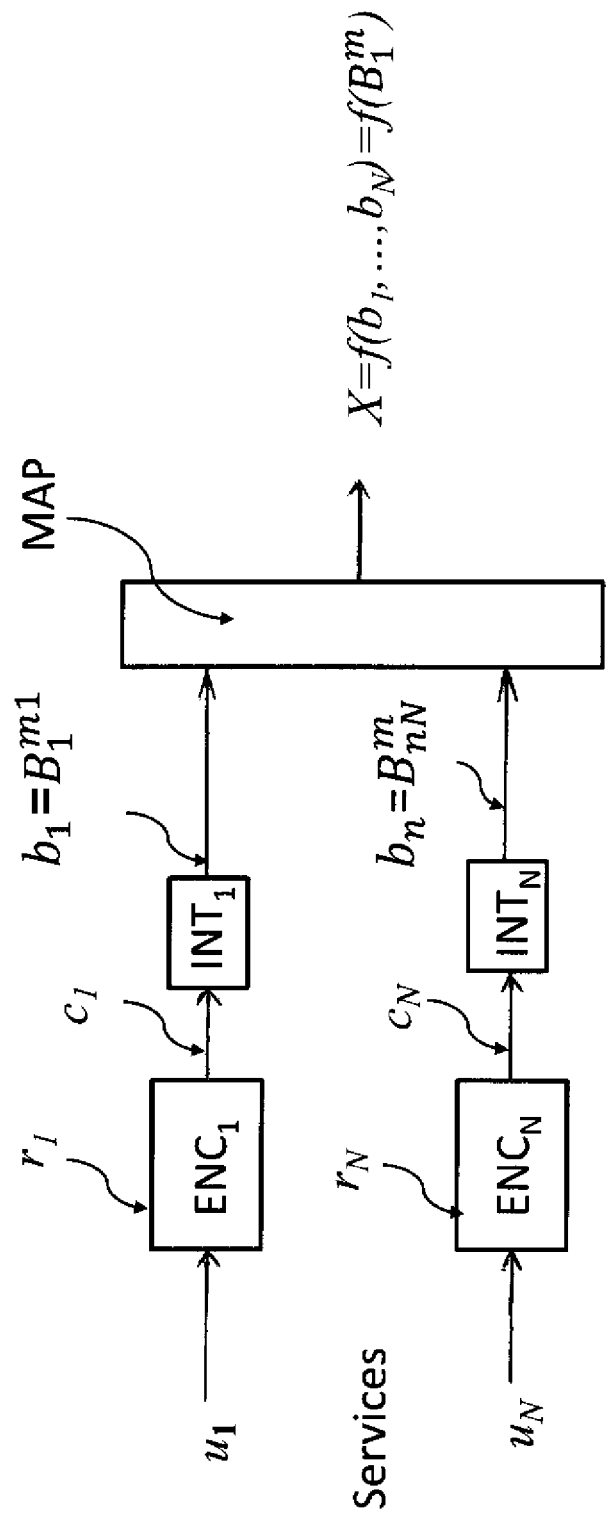
FIG. 3 and FIG. 4 show different embodiments of block diagram of the transmitter.

FIG. 3 shows the block diagram of the transmitter general Hierarchical Modulation scheme. The bits generated by the encoders $ENC_1 \ldots ENC_N$ associated to different services $m_i$ are mapped to a constellation set of cardinality $M=2^m$.

The design of this transmitter scheme requires the choice of the rates of binary encoders $r_i$, the modulation efficiencies of each service $m_i$, the complex constellation set (image of f), as well as the binary labelling $x=f(B_1, \ldots, B_m)$.

The N services $u_1 \ldots u_N$ are fed to a plurality of encoding blocks $ENC_1 \ldots ENC_N$ wherein each block applies the rates of the binary encoders $r_i$ in order to obtain the encoded bits $c_i$. Said encoded bits $c_i$ are in turn fed to a plurality of interleave blocks $INT_1 \ldots INT_N$, wherein in each interleave block $INT_i$ the encoded bits $c_i$ are grouped into blocks of $m_i$ bits.

Each group of $m_i$ bits is fed to the MAP block.

The Linear Superposition of services and bits Superposition Modulation (SM) approach will now be described.

Figure 4:
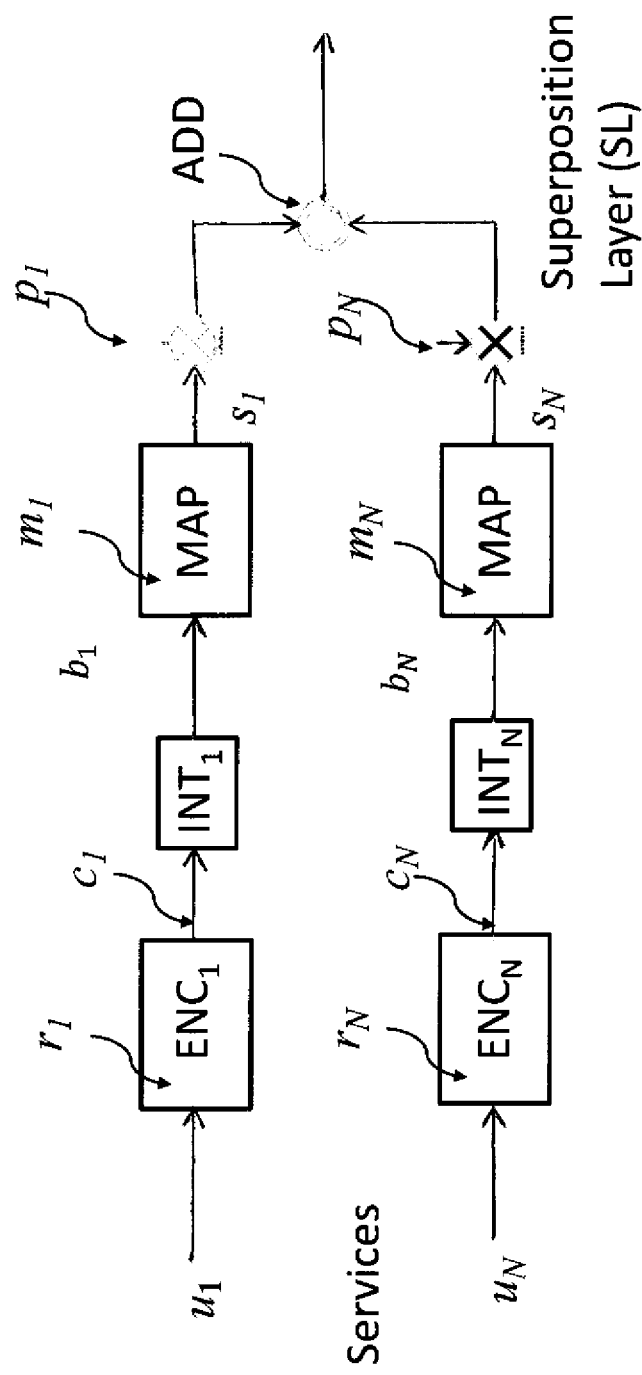

The block diagram of the second considered encoding and modulation scheme is shown in FIG. 4.

FIG. 4 is the block diagram of the transmitter scheme with Superimposed Layer (SL).

The set of N services are encoded by using independent powerful (turbo-like) binary codes $ENC_i$ with code rates $r_i$, generating the sequence of coded bits $c_i$ that are interleaved $INT_i$ and sent to the group of mappers $MAP_i$.

For each service, the mapper $MAP_i$ groups the blocks of $m_i$ bits and select a constellation point from a two-dimensional constellation with cardinality $M_i=2^{m_i}$.

The output of each mapper $MAP_i$, referred as is combined in an addition node ADD. The spectral efficiency associated to the service is then $R_i=r_i m_i$.

In this embodiment, the constellation points from different services are then superimposed by using a set of real or complex coefficients $p_i=\sqrt{P_i}$, yielding the transmitted symbol $$x = \sum_{i=1}^{N} p_i s_i.$$

Notice that the block diagram in FIG. 4 is representative of any superposition modulation scheme found in literature.

The different proposed design solutions consider different adopted modulation sets, set of service rates and performance measures for the design of the transmitter.

None of the solutions proposed in literature provide a specific design method that is suited for the adoption of this technique over the non-linear channel.

Superposition Modulation (SM) is the modulation technique that has been proposed by several authors as an efficient way to build modulation sets achieving performance close to the Shannon limit.

Figure 5:
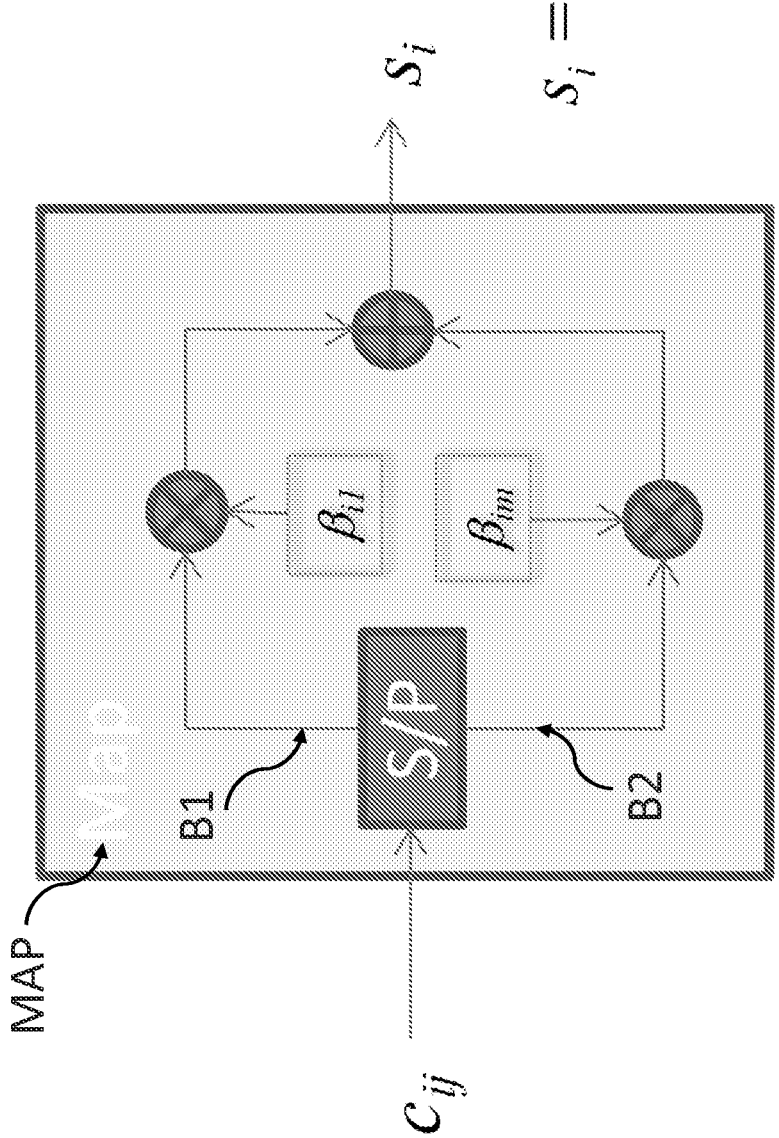
FIG. 5 and FIG. 6 show the block diagram of the superposition modulator and the block diagram of the transmitter scheme.

The modulation symbols also in this case are obtained by linearly superposing binary sequences $c_j$ with suitable real or complex coefficients (see FIG. 5)

$$s = \sum_{j=1}^{m} \beta_j (1 - 2c_j).$$

The FIG. 5 shows the block diagram of the superposition modulator.

The coefficient $c_{ij}$ is fed to the MAP block and reaches a S/P block which splits the coefficient over a plurality of branches $B_i$. Each branch $B_i$ is multiplied for the coefficient $\beta_i$ and summed in order to obtain the value $s_i$.

In particular, the value is calculated as $s_i = \sum_{i=1}^{m_i} \beta_{ij}(1-2c_{ij})$ This technique indeed has been shown to yield performance close to the optimal when the coefficients $\beta_{ij}$ are properly optimized.

In this embodiment, the Superposition Modulation (SM) is then constructed using the same previously described for the broadcast channel for the superposition of services. The difference here is that bits used for constructing the modulation symbols are associated to the same service and thus generated by the same encoder.

Figure 6:
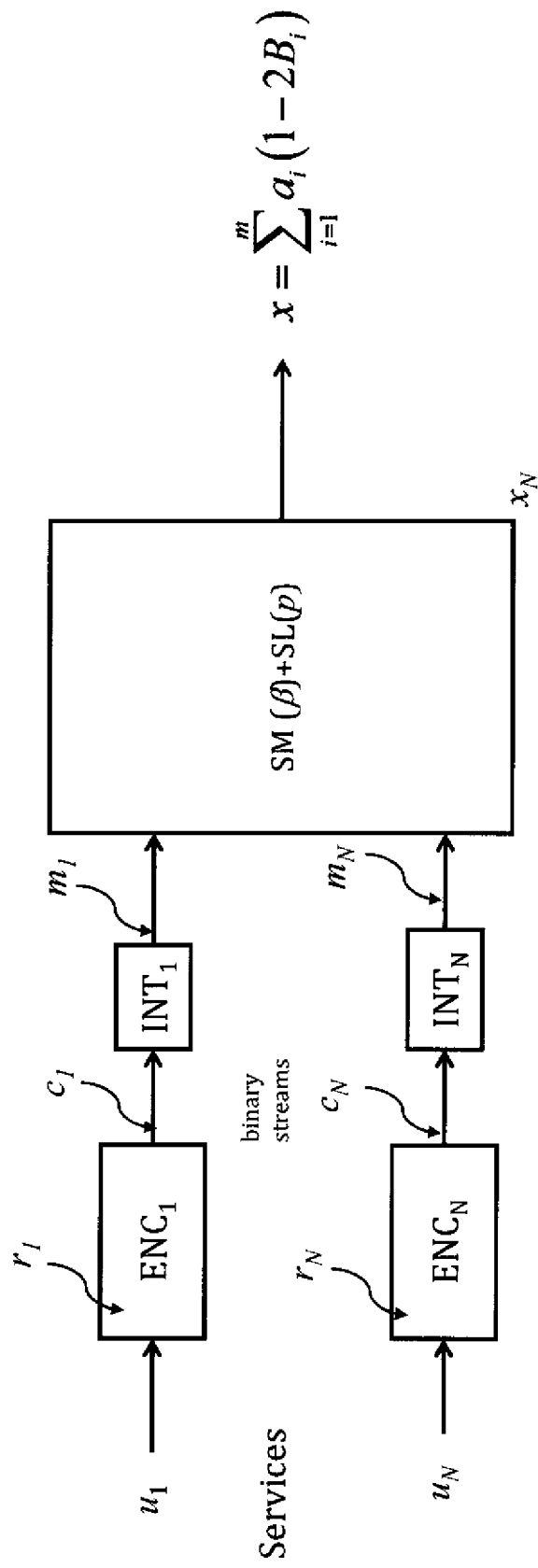

It seems then natural and efficient in the broadcast scenario to pair the Superimposed Layer (SL) technique with the Superposition Modulation (SM) technique, yielding the encoding and modulation scheme represented in FIG. 6.

$$x = \sum_{i=1}^{N} p_i s_i = \sum_{i=1}^{N} \sum_{j=1}^{m_i} p_i \beta_{i,j}(1-2c_{i,j}) = \sum_{k=1}^{m} a_i(1-2B_k)$$

where $c_{ij}$ is the j-th bit generated by the i-th service, while $B_k$ denotes a generic bit at the input of the superposition mapper.

FIG. 6 shows the block diagram of the transmitter scheme with SL and SM.

In particular, in this case the MAP block (SM($\beta$)+SL(p)) receives in input the $m_i$ bits and calculates the output as $$x = \sum_{i=1}^{m} a_i(1-2B_i).$$

Design of this transmitter scheme requires the choice of the rates of binary encoders $r_i$, the modulation efficiencies of each service $m_i$, and the m complex coefficients $a_i$ that jointly define the superposition modulation and the superposition of layers.

Now the proposed receiver techniques will be described.

Figure 7:
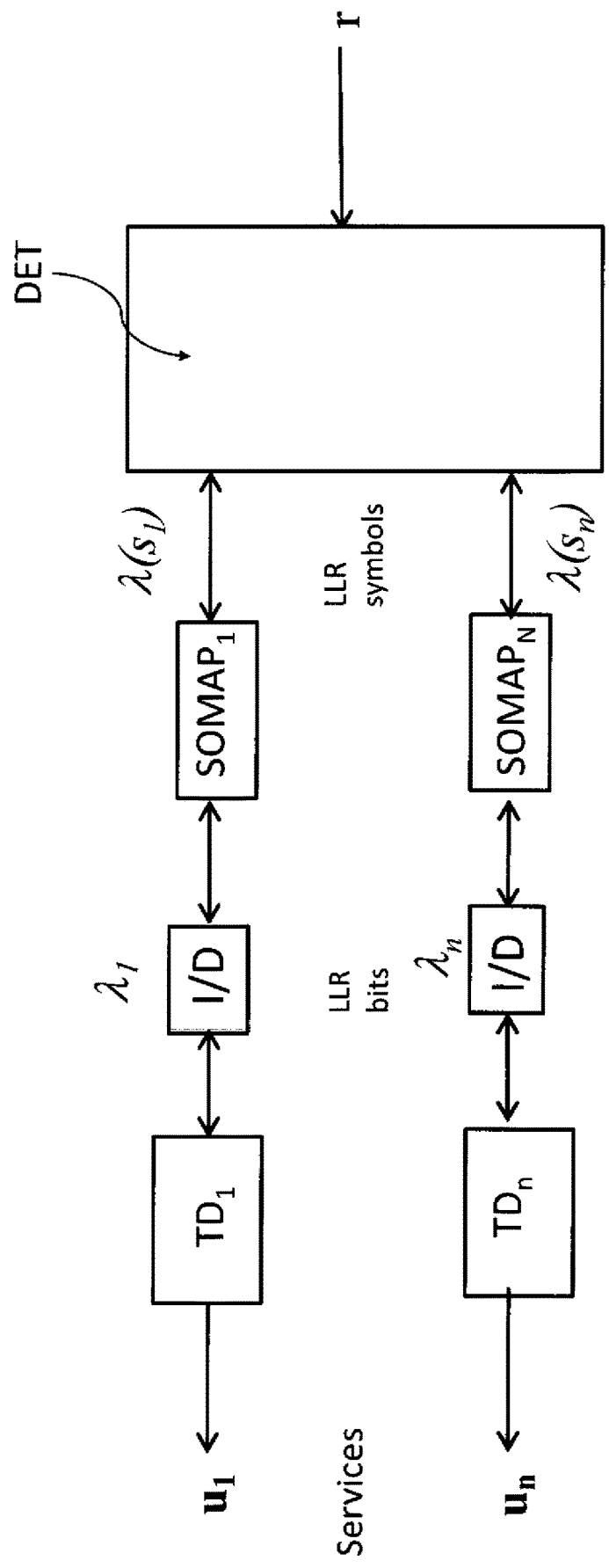
FIG. 7 and FIGS. 8a, 8b, 8c and 8d show different embodiments of block diagram of the receiver.

A block diagram of the proposed iterative receiver associated to the transmitter of FIG. 3 or FIG. 6 is shown in FIG. 7.

In particular, FIG. 7 shows the block diagram of a generic receiver for the superposition scheme of FIG. 4.

In this embodiment, the samples at the output of the matched filter r, enter the block named "detector", referred as DET that computes the Log-Likelihood Ratios (LLR) of the transmitted symbols $\lambda(s_i)$ for each service. The LLR symbols are converted to LLR bit by the Soft Output Mapper block (SOMAP), and then interleaved by block I/D, and the sequence of interleaved LLR bits enter the turbo decoder $TD_i$ associated to each service.

The superposition of services requires that iterations are performed between decoder and detector to achieve acceptable performance.

For each iteration, the updated extrinsic from each decoder is fed back to the detector, which updates the LLR computation by exploiting the extrinsic information coming from other superimposed symbols.

Figure 8A:
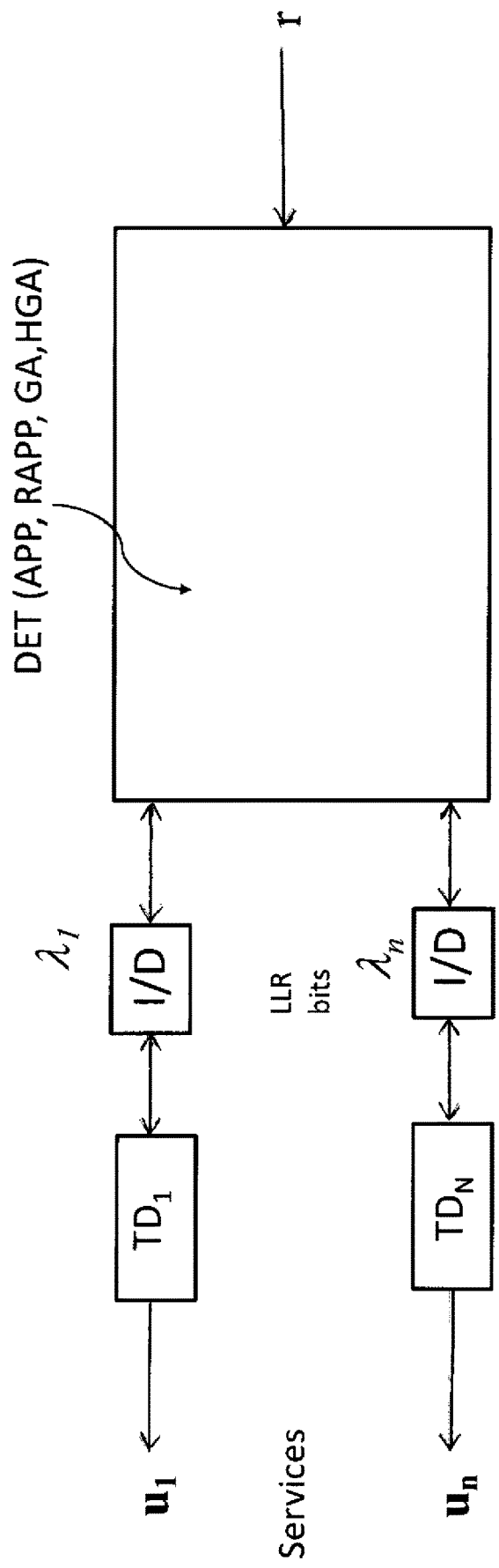

The SOMAP block computing the "LLR on bits" from the "LLR on symbols" can be merged into the detector block, yielding the receiver scheme of FIG. 8a.

FIG. 8a shows the block diagram of a generic receiver for a broadcast channel with binary encoders and multiple services (Transmitters of FIG. 6 and FIG. 3).

In this embodiment, the detector block takes the samples r at the output of the channel and the extrinsic LLR on the m binary streams fed back from the N decoders and computes the updated extrinsic LLR.

All iterative receivers adopted for transmitter schemes like those represented in FIG. 3 or in FIG. 6 fall in the considered generic receiver reported in FIG. 8a.

Figure 8B:
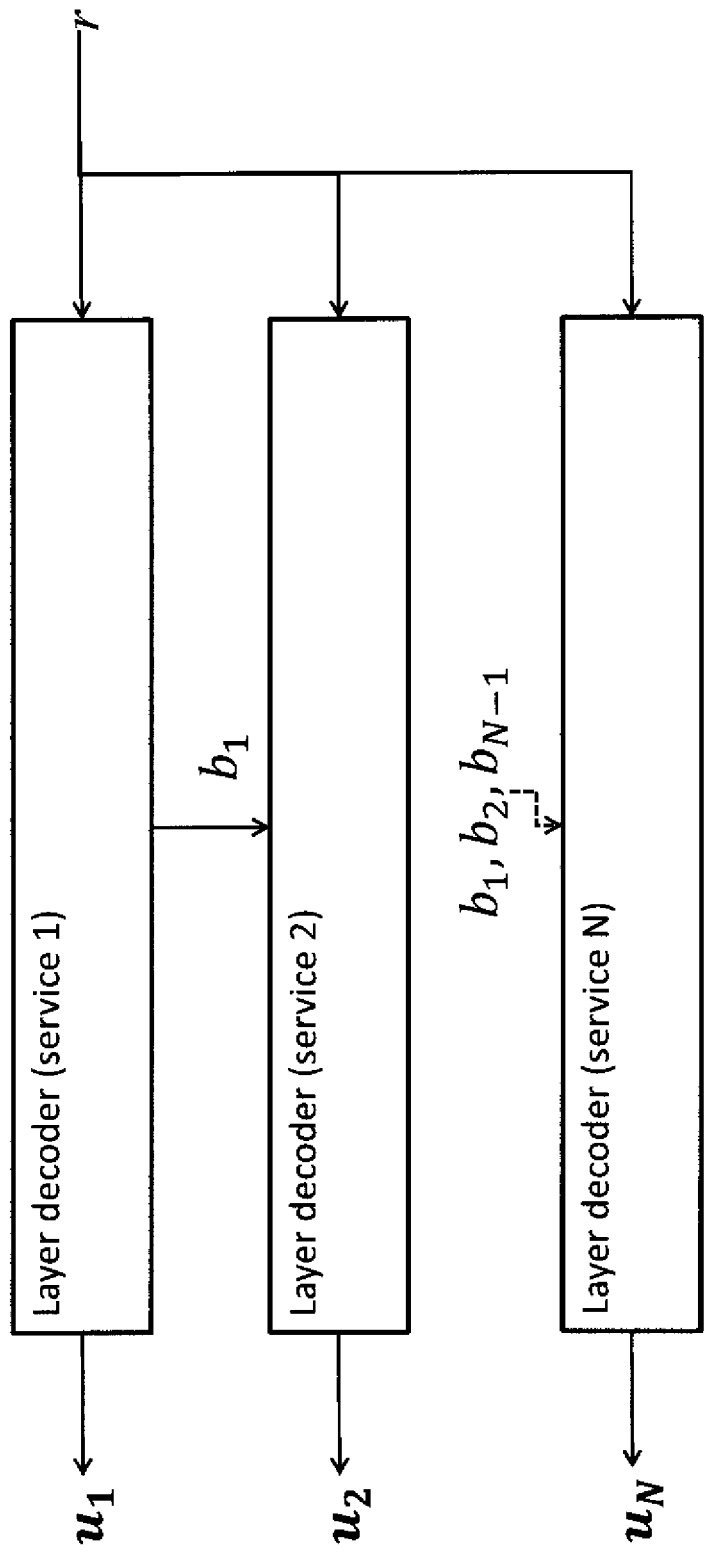
Figure 8C:
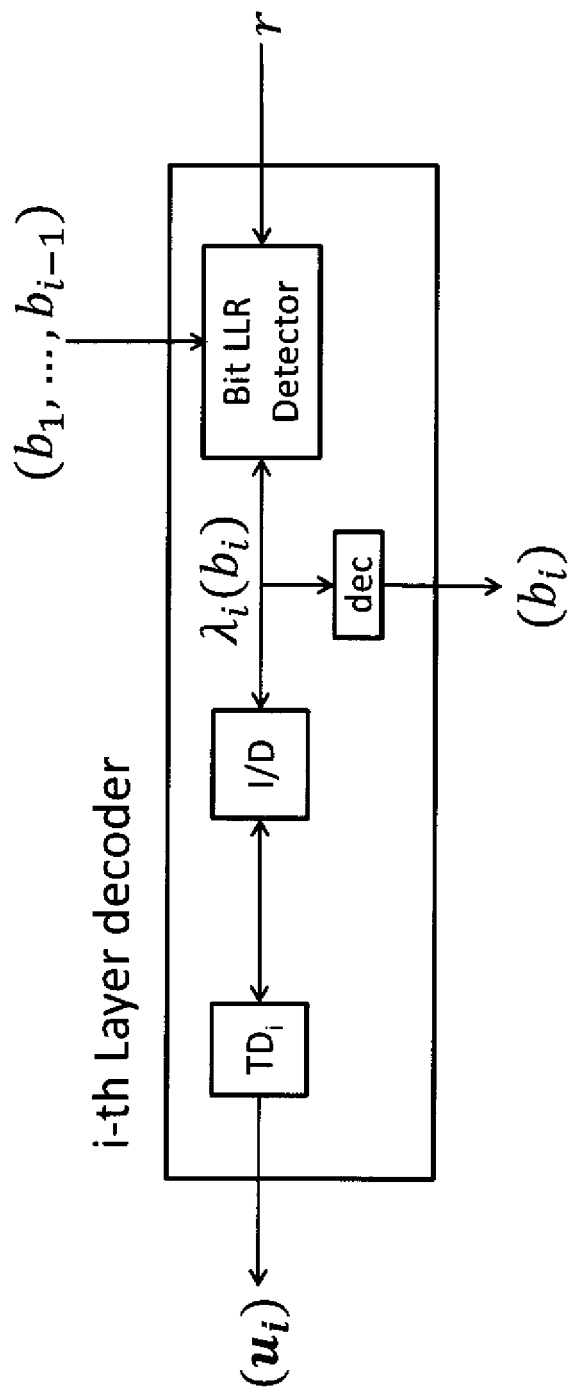
Figure 8D:
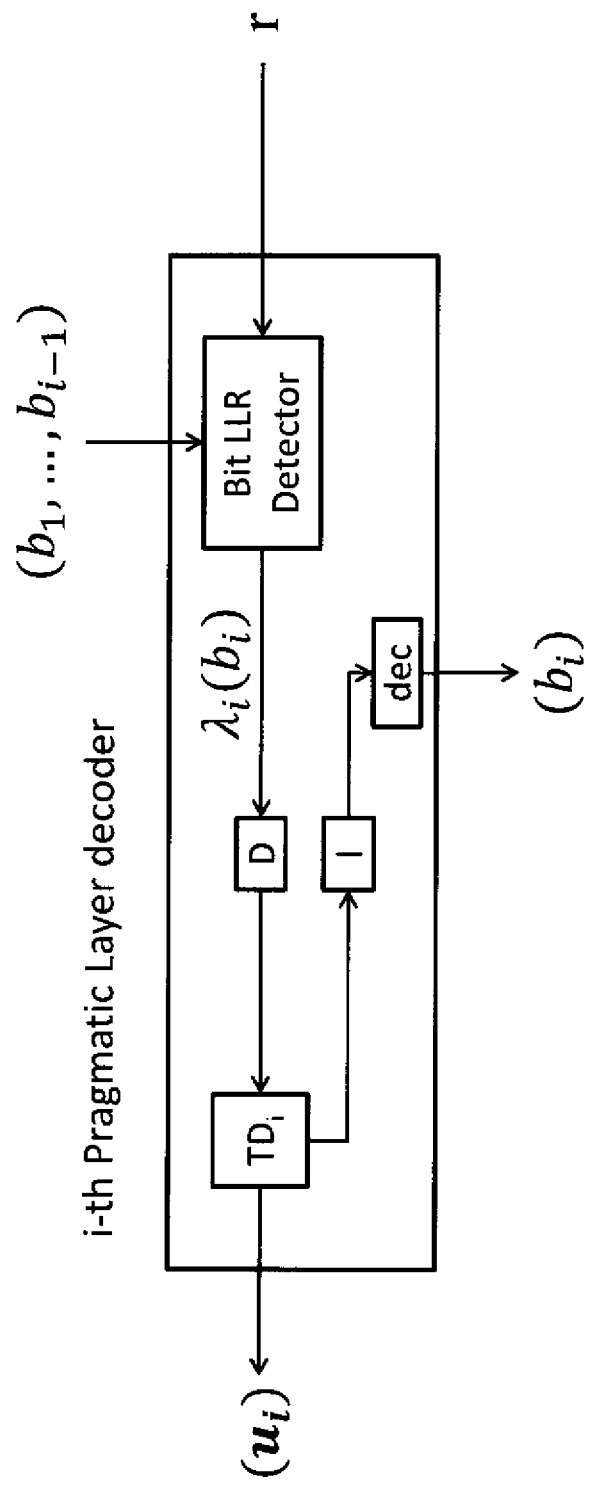

FIG. 8b shows the structure of the layer decoder, and FIGS. 8c and 8d show embodiments of the i-th layer decoder and the i-th pragmatic layer decoder.

The difference among different proposed implementations is due to the adopted scheduling of iterations between detector and decoders of the different services and in the implementation of the detector block, which has a crucial impact on both the complexity and the performance of the receiver.

Depending on the value of the coefficients $p_i$ used for the superposition, sometimes it may be computationally more efficient to proceed service by service in the decoding. This type of decoding, sometimes named "onion peeling" or successive interference cancellation (SIC) can be viewed as a particular scheduling of the receiver represented in FIG. 8a.

In this embodiment, in the first iteration only the symbols related to the first service are computed. The decoder for this service runs until a reliable estimate of the codeword is formed.

The extrinsic information coming from the decoding of the first service is then used to compute the LLR for the next service and so on.

Since iteration with the detector take place only after convergence of the iterative decoder of a given stage, extrinsic LLR are typically reliable and the optimal detector for the next binary stream actually corresponds to the cancellation of the decoded service.

This approach delivers reliable output for the i-th service after exactly "i" detector iterations.

Error propagation sometimes may considerably deteriorate the performance of SIC receivers. More sophisticated scheduling can be adopted also considering that the turbo binary decoder itself usually embeds two or more decoding stages.

The scheduling strategy for the full receiver thus requires to decide the order of execution of at least three decoding modules so as to achieve a fast convergence with the minimal amount of complexity.

Scheduling optimization is then a rather complicated task, which also depends on the adopted architecture of the receiver, considering that also concurrent decoding processing is possible. In this preliminary investigation phase, it is considered few possible scheduling strategies, considering the performance and complexity trade-offs.

A major source of complexity in the receiver of FIG. 8a may derive from the operations performed in the detector block. For optimal detector (APP) the expression of the bit LLR is in fact $$\lambda_i = \max_{x:B_i=1}{}^* \log(p_a(x)p(r|x)) - \max_{x:B_i=0}{}^* \log(p_a(x)p(r|x)), \quad (1)$$

The reduction of modulation set (RAPP) will be described.

A possible method to reduce the complexity of the optimal APP detector is to reduce the number of points in the modulation set used for the computation of LLR depending on the received samples. This idea is similar to the idea beyond the sphere decoder proposed as a suboptimal detector in the MIMO case.

In this embodiment, for large signal-to-noise ratio the likelihoods p(r|x) of symbols x far from the received sample are indeed very small and can be neglected or substituted with a small constant value. In this case, defining a parameter ρ as the maximum considered distance from the received point r, equation (1) can be rewrote as $$\lambda_{i,j} \approx \max_{x:c_{i,j}=1,|x-r|<\rho} \log(p_a(x)p(r|x)) - \max_{x:c_{i,j}=0,|x-r|<\rho} \log(p_a(x)p(r|x)).$$

where the modulation set has been reduced to a neighbourhood of the observation r. The choice of the parameter ρ in this case allows to trade complexity with performance. Another suboptimal approach to the LLR computation with linear complexity that works for superposition modulation (FIG. 4) is that of performing soft cancellation.

For each of the considered binary streams the interference from the other binary streams is eliminated using the available extrinsic information fed back from the binary decoder and modelling the digital interference as a Gaussian random variable.

For each binary stream, first a new observation $r_i$ reconstructed by soft cancelling the other interfering streams $$r_i = r - \sum_{j \neq i} h_j \tilde{x}_j$$

and then the LLR is computed as $$\lambda_i = \frac{2r_i}{\sigma^2 + \sigma_i^2}.$$

The value of means $\tilde{x}_j$ and the variances $\sigma_i^2$ of interfering symbols are obtained from extrinsic information, used as a-priori information.

Although very simple, this approach may lead to unacceptable performance losses. Gaussian approximation yields unacceptable losses for large SNR.

Hybrid solution performing a trade-off between this approach and the optimal approach has been studied.

In this embodiment, the proposed hybrid detector approximates the probability density function (pdf) of residual interference by applying the Gaussian approximation on more reliable interfering symbols, while calculating the exact probability density function of unreliable interfering symbols. By adjusting the number of interfering symbols employing the Gaussian approximation, this hybrid scheme provides a flexible solution to compromise between performance and complexity.

Now will be described the process for design the non-orthogonal transmitter systems. Given the proposed transmitters (FIG. 3, FIG. 6) and receiver (FIG. 8a) schemes the following is the design methodology adopted.

Scenario setting. Each scenario is described by providing the number of required services N, the relative rate of each service through a vector (1, $R^*_2/R^*_1$, ..., $R^*_N/R^*_1$), the relative attenuation of each user class with respect to the worst one through the vector ($\alpha^*_1/\alpha^*_2$, ..., $\alpha^*_1/\alpha^*_N$), the signal to noise ratio of the worst user class F, and the interference to noise ratio of the worst user $\Gamma_I$.

The signal to noise plus interference ratio of each user class can then be obtained as $$SNIR_j = \frac{\Gamma}{\alpha^*_j/\alpha^*_1 + \Gamma_I}$$

TX type. The two encoding schemes of FIG. 3 and FIG. 6 are considered. The total number of bits of the modulation set m is fixed.

RX type. A SIC receiver is considered, where each service is decoded sequentially. Also, pragmatic receivers are considered, where binary decoders are employed and no iterations take place on a single service between detector and decoder.

Power constraint. Two types of power constraint were considered. Peak power constraint and average power constraint.

Given the broadcast scenario setting, the power constraint, the TX type and the adopted RX scheme (pragmatic or not pragmatic), the modulation set is designed, the corresponding binary labelling and the optimal allocation vector of modulation bits to service ($m_1 \ldots m_N$) so that the vector of average mutual information under ideal SIC decoding for each service ($I_1 \ldots I_{Ns}$) satisfies ($I_1, \ldots, I_{Ns}$)≥β(1, ..., $R^*_N/R^*_1$) with β as large as possible.

From it, the required code rates for the binary codes is then obtained as ($r_1, \ldots, r_N$)=($I_1/m_1, \ldots, I_N/m_N$)

Then, pick the set of the encoders within the class of LDPC encoders defined in the DVB-SX standard by choosing those with the closest but smaller rate.

Figure 9:
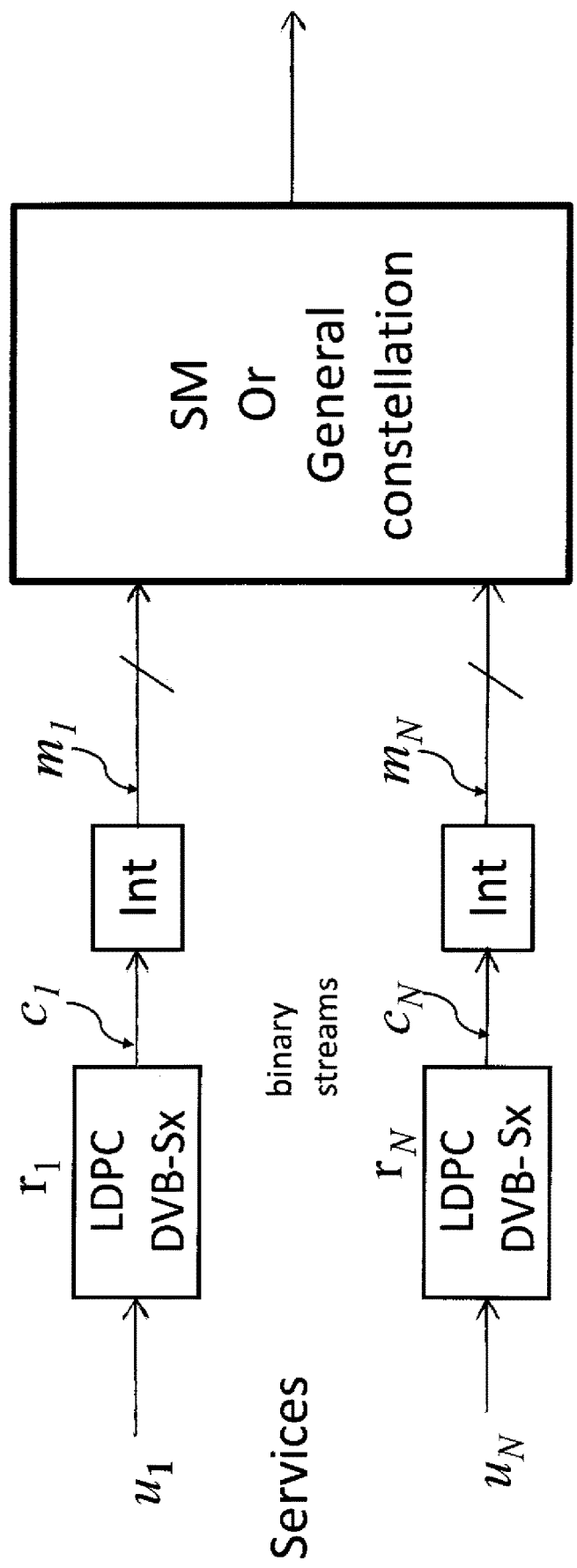
FIG. 9 shows a general structure of the designed TX system.

The resulting TX structure is reported in FIG. 9.

In particular, FIG. 9 shows the general structure of the designed TX system.

In the following sections, there are provided more details on each step of this design procedure.

1) Input Solution Sets

Corresponding to the two schemes of FIG. 3 and FIG. 6 for the constellation design space the two extreme cases were considered, where one can completely design the complex constellation set x=($x_1, \ldots, x_M$), or when the constellation set is defined as in superposition modulation through the set of complex coefficients a=($a_1, \ldots, a_m$).

In the general case, the vector x has $2 \times 2^m$ real dimensions. In this case, to reduce the design space, the quadrant symmetry condition is adopted, imposing symmetry of the constellation to reflections to both axes.

With this condition, the coordinates of all the constellation points can be computed starting from the coordinates of the first M/4 constellation points as follows:

$$\left.\begin{array}{l} x_{M/4+2i} = +x_{2i}, \quad x_{M/4+2i+1} = -x_{2i+1} \\ x_{2M/4+2i} = -x_{2i}, \quad x_{2M/4+2i-1} = +x_{2i+1} \\ x_{3M/4+2i+1} = -x_{2i}, \quad x_{3M/4+2i+1} = -x_{2i+1} \end{array}\right\} i = 0, \ldots, M/4-1$$

Thus, reducing the design space to M/2 real dimensions.

With superposition modulation, the complex constellation set of size M=$2^m$ is defined through the set of m complex coefficients $a_i$ as follows $$x(B_1, \ldots, B_m) = \sum_{j=1}^{m} a_i(1-2B_i) \qquad (2)$$

For eight points constellations, the design space has then dimensionality four for the general case and six for Superposition Modulation.

For sixteen points constellations, the design space has dimensionality eight for the general case and eight for Superposition Modulation.

For thirty-two points constellations, the design space has then dimensionality sixteen for the general case and ten for Superposition Modulation.

In the following, there are described the objective functions that have been considered for maximization in the constellation design.

For defining the objective function in broadcasting channel with an ideal SIC receiver, the procedure starts by writing the output of the AWGN channels relative to the N users as $Y_j = x(B_1, \ldots, B_m) + Z_j$ $j = 1, \ldots, N$ and then define the SIC receiver mutual information of the j-th user class relative the j-th service, as $I_j^{(SIC)} = I(B_{b_j}^{b_{j+1}-1}; Y_j | B_1^{b_j-1})$ where $b_j$ is the index of the first bit associated to the j-th service:

$$b_j = 1 + \sum_{i=1}^{j-1} m_i, \text{ and } B_a^b = (B_a, \ldots, B_b).$$

As the interest is in designing a system guaranteeing a given rate vector $R^* = (R^*_1, \ldots, R^*_N)$ rather than the sum rate, the objective function in this case is defined as $$\beta^{(SIC)}(x) = \min_{1 \leq j \leq N} \frac{1}{R_j^*} I\left(B_{b_j}^{b_{j+1}-1}; Y_j \Big| B_1^{b_j-1}\right) \quad (3)$$

So that the optimized constellation will be able to reliably support the rate vector $$(I_1^{(SIC)}, \ldots, I_N^{(SIC)}) \geq \beta^{(SIC)}(R^*_1, \ldots, R^*_{N_s}).$$

When using "pragmatic" SIC receiver, while it is still assumed that previous services has been reliably decoded, the individual $m_i$ bits associated to each service are detected independently, and the correspondent pragmatic MI of each stage is then $$I_j^{(SIC,b)} = \sum_{i=b_j}^{b_{j+1}-1} I\left(B_i; Y_j \Big| B_1^{b_j-1}\right),$$

and consequently the objective function becomes:

$$\beta^{(SIC,b)} = \min_{1 \leq j \leq N_s} \frac{1}{R_j^*} \sum_{i=b_j}^{b_{j+1}-1} I\left(B_i; Y_j \Big| B_1^{b_j-1}\right) \quad (4)$$

The optimized constellation will be then able to support the rate vector $$(I_N^{(SIC,b)}, \ldots, I_N^{(SIC,b)}) \geq \beta^{(SIC,b)}(R^*_1, R^*_{N_s}).$$

The effect of the non-linearity in the transmitter design will now considered.

The TX design approach proposed in the previous section neglects the presence of a non-linearity in the system.

It has to be noted that while several previous studies evaluate the impact of the non-linearity and other realistic impairment in a satellite broadcast system, the inclusion of the non-linearity in the design stage of the transmitter has never been considered previously. In satellite channels constrained by the use of a nonlinear amplifier the optimization of the constellation should be properly modified.

Figure 10:
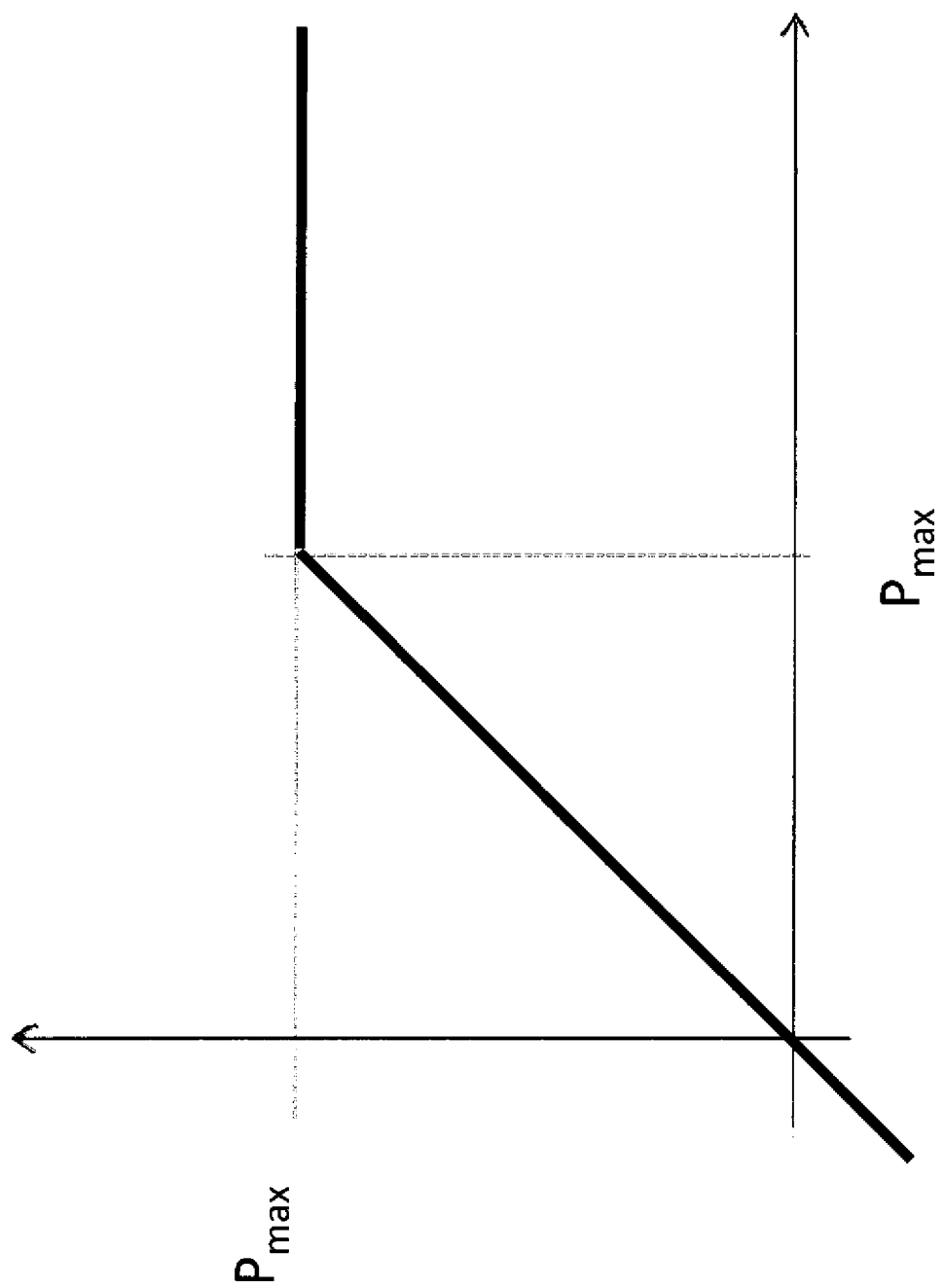
FIG. 10 shows the soft limiter modelling the non-linearity.

In these cases, representing the AM/AM curve of the non-linearity with the simplified soft limiter of FIG. 10, the only modification to adopt in the constellation optimization stage is to substitute a peak power constraint to the usual average power constraint.

In particular, FIG. 10 shows the soft limiter modelling the non-linearity. The peak power of the constellation becomes the relevant parameter.

Thus, for average power constraint $$E_{AP}(x) = \frac{1}{M} \sum_{i=0}^{M} x_{2i}^2 + x_{2i+1}^2,$$

and for the peak power constraint $$E_{PP}(x) = \max_{0 \leq i < M} (X_{2i}^2 + X_{2i+1}^2)$$

To perform the design of the constellation set, it has been used the simulation annealing (SA) technique which provides satisfactory results also for non-convex problems.

In the following a summary of the steps of the SA algorithm for the maximization of an generic objective function f(x), over a solution space of N real dimensions $x = (x_1, \ldots, x_N)$.

1. Pick a random initial solution $x_0$ and evaluate the correspondent objective function $f(x_0)$, and set $M = f(x_0)$
2. Loop on $n = 1, \ldots, n_M$
   a) Set temperature according to a non-increasing "cooling" function $t_n = C(n)$
   b) Randomly perturb the solution $x_n = x_{(n-1)} + \Delta(t_n)$ and evaluate the objective function $f(x_n)$
   c) if $f(x_n) > M$ set $M = f(x_n)$, save $x_M = x_n$
   d) else accept the solution with probability $e^{(f(x_n)-M)/t_n}$, otherwise undo perturbation: $x_n = x_{(n-1)}$
3. goto step 2.
4. Return $x_M$, and the corresponding value of M Different SA algorithms are obtained by changing the cooling and perturbing functions $t_n = C(n)$ and $\Delta(n)$.

The following cooling functions has been considered:
Logarithmic cooling:

$$t_n = \frac{2}{\log(n+1)}$$

this is the slowest possible cooling algorithm and it can provide the optimal global solution under some condition on the objective function.

Exponential cooling $t_n = \alpha^n$ $0 < \alpha < 1$

Very fast cooling function that however very often provides local solutions.

Polynomial cooling $t_n = n^\alpha$ $\alpha < 0$

Intermediate cooling function. In the initial SA tuning phase, the polynomial cooling turned out to be the best compromise between efficiency and speed. In particular it has been used α between −0,4 and −0,6.

The random perturbation Δ(n) is performed by picking a uniformly random element of the solution vector x and randomly moving it in an interval that depends on the current temperature:

$$x_R \leftarrow x_R + 2D_0 t_n(U-0.5)$$

where R is a discrete uniform random variable in [1, ..., N] and U is a uniform random variable in [0,1[.

In addition, further simulations results based on practical design of the constellation and detector were obtained particularly for the second Example (Continuous Aero Service). Simulation results indicate that the proposed solution can maintain up to 150% additional throughput for high rate terminals by using signal overlay as opposed to ACM and time-sharing approach. In this particular case, the theory predicts up to 200% gain but only when Shannon capacity bounds are used.

Therefore, the proposed solution discloses a method for design an optimized constellation set and labeling for satellite point to multi-point transmission systems comprising transmitters and receivers. The transmitters are adapted to create signals overlay and are configured to allow simultaneous transmission of at least two different data streams (services) intended for users with different radio link qualities. In particular, the N services are provided to users having a good radio link and a subset of services is maintained and guaranteed for the users having a lower radio link quality condition.

More in details, in the system the channel and traffic scenario is described by providing the number of required services N, the relative required throughput of each service through a first vector $(1, R^*_2/R^*_1, \ldots, R^*_N/R^*_1)$, the relative attenuation of each user class with respect to the worst one through a second vector $(\alpha^*_1/\alpha^*_2, \ldots, \alpha^*_1/\alpha^*_N)$, the signal to noise ratio of the worst user class Γ, and the interference to noise ratio of the worst user $\Gamma_I$.

In particular, the transmitter is configured for encoding the data streams of the set of N services by using independent powerful binary codes($ENC_i$) with code rates ($r_i$), generating the sequence of coded bits ($c_i$) that are interleaved ($INT_i$) generating sequence of blocks of $m_i$ bits ($b_i$), where $(b_i)=(B_{n_i}^{n_{i+1}-1})$. Moreover, the blocks of $m_i$ bits ($b_i$) are fed to a mapper (MAP) that maps the bits generated by all services to a single constellation set according to a mapping $f(b_1, \ldots, b_N)=f(B_1^m)$, with $n_i=\Sigma_{j=1}^{i-1} m_j$ and $m=\Sigma_i m_i$.

The system comprises a plurality of receivers, and each receiver is configured for allowing the decoding of one or more overlay services in a cascade "onion peeling" manner.

Additionally, each receiver starts decoding the first service with the lowest detection threshold in terms of required signal quality and proceeds to the following layers decoders when reliable decisions are available on bits at previous layer.

Moreover, the maximum number of services that can be decoded depends on the user radio link quality.

Furthermore, the i-th layer decoder is activated only if the previous i−1 layer decoding step is successful and exploits the reliable estimates of all bits $(b_1, \ldots, b_{i-1})=B_1^{n_i-1}$.

Additionally, the samples at the output of a matched filter (r), enter the i-th layer decoder together with estimates of previous layers, and the i-th layer decoder provide the reliable decoded data stream bits ($u_i$) together with reliable estimate of the coded bits blocks ($b_i$).

In particular, the method for design the optimized constellation set comprises the steps of:

selecting a constellation cardinality of $M=2^m$;
selecting a splitting of modulation bits $m_i:\Sigma_i m_i=m$ to services;
selecting a power constraint;
selecting a target structure for the layer decoders in all the receivers;
selecting a structure for the mapping $f(b_1, \ldots, b_N)$ characterized by a set of parameters α.

Furthermore, the set of parameters α is selected in order to satisfy the power constraint maximizing the value of β as follows:

$$\alpha = \text{argmax } \beta:(I_1, \ldots, I_N) \succ \beta(1, \ldots, R^*_N/R^*_1)$$

wherein the $I_i$ are the mutual information value associated to the i-th layer, as a function of the system parameters.

Moreover, a maximization is performed with a simulated annealing technique and the mutual information values $I_i$ are used to select the required code rates as $r_i \leq I_i/m_i$.

In some embodiments, the power constraint is selected as peak power constraint according to $$\max_{B_1^m} f(B_1^m) \leq P.$$

In other embodiments, the power constraint is selected as average power constraint according to $$\frac{1}{M} \sum_{B_1^m} f(B_1^m) \leq P.$$

In some embodiments each receiver comprises a pragmatic layer decoder, wherein no iteration takes place between the binary decoder and the detector block. In particular, the target mutual information of the i-th layer is computed as follows:

$$I_i = \sum_{j=n_i}^{n_{i+1}-1} I(B_j; Y_i | B_1^{n_i-1})$$

where $Y_i=f(B)+N_i$ and $N_i$ is a gaussian random variable with variance computed according to radio link quality associated to the target users of the i-th service.

In particular, the receivers comprise optimal layer decoders and the target mutual information value of the i-th layer is computed as follows:

$$I_i = I(B_{n_i}^{n_{i+1}-1}; Y_i | B_1^{n_i-1})$$

wherein $Y_i=f(B)+N_i$ and $N_i$ is a gaussian random variable with variance computed according to radio link quality associated to the target users of the i-th service.

In some embodiments, the mapping f is general and the set of parameters α is the list of $M=2^m$ complex coordinates of the points in the constellation set.

In some embodiments, a quadrant symmetry is selected for the constellation set, and the set of parameters α is the list of the first M/4 complex coordinates of the constellation set, and the remaining ones are obtained by symmetry as follows:

for all $x \in \left[0, \ldots, \frac{M}{4} - 1\right]$ $$f\left(x + \frac{M}{4}\right) = -f^*(x)$$

$$f\left(x + \frac{M}{2}\right) = -f(x)$$

$$f\left(x + \frac{3M}{4}\right) = -f^*(x).$$

In other embodiments, the mapping f is the superposition of layers with general modulation for each layer $$f(b_1, \ldots, b_N) = \sum_{i=1} \alpha_i f_i(b_i)$$

and the set of parameters defining this structure is, for each layer, the list of $2^{m_i}$ coordinates of the complex points of the constellation set and the complex coefficient $\alpha_i$ used for the linear combination.

In one or more embodiments the mapping f is a superposition of layers, and each layer uses a constellation set obtained as the superposition of binary modulations $$f(b_1, \ldots, b_N) = \sum_{i=1}^m p_i(1 - 2B_i)$$

and the set of parameters $\alpha$ defining said structure is the list of m complex coefficients $p_i$.

In one or more embodiments, the set of parameters $\alpha$ defining the mapping is reduced by forcing one or more of the constellation sets $f_i$ to some predetermined constellation set.

The solution describes also a system wherein the transmitter adopts a constellation set that has been designed according to the disclosed method.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. A method for design an optimized constellation set and labeling for satellite point to multi-point transmission systems comprising transmitters and receivers, wherein said transmitters are adapted to create signals overlay and are configured to allow simultaneous transmission of at least two different data streams (services) intended for users with different radio link qualities, wherein N services are provided to users having a good radio link and a subset of services is maintained and guaranteed for the users having a lower radio link quality condition, wherein said system comprises:
  describing the channel and traffic scenario by providing the number of required services N, the relative required throughput of each service through a first vector $(1, R^*_2/R^*_1, \ldots, R^*_N/R^*_1)$, the relative attenuation of each user class with respect to the worst one through a second vector $(\alpha^*_1/\alpha^*_2, \ldots, \alpha^*_1/\alpha^*_N)$, the signal to noise ratio of the worst user class $\Gamma$, and the interference to noise ratio of the worst user $\Gamma_1$;
  a transmitter, configured for encoding the data streams of the set of N services by using independent powerful binary codes($ENC_i$) with code rates ($r_i$), generating the sequence of coded bits ($c_i$) that are interleaved ($INT_i$) generating sequence of blocks of $m_i$ bits ($b_i$), where $(b_i) = (B_{n_i}^{n_{i+1}-1})$, wherein said blocks of $m_i$ bits ($b_i$) are fed to a mapper (MAP) that maps the bits generated by all services to a single constellation set according to a mapping $f(b_1, \ldots, b_N) = f(B_1^m)$, with $n_i = \sum_{j=1}^{i-1} m_j$ and $m = \sum_i m_i$;
  a plurality of receivers, each receiver configured for allowing the decoding of one or more overlay services in a cascade "onion peeling" manner, wherein each receiver starts decoding the first service with the lowest detection threshold in terms of required signal quality and proceeds to the following layers decoders when reliable decisions are available on bits at previous layer, and wherein the maximum number of services that can be decoded depends on the user radio link quality, and wherein the i-th layer decoder is activated only if the previous i-1 layer decoding step is successful and exploits the reliable estimates of all bits ($b_1, \ldots, b_{i-1}) = B_1^{n_i-1}$, and wherein the samples at the output of a matched filter (r), enter the i-th layer decoder together with estimates of previous layers, and the i-th layer decoder provide the reliable decoded data stream bits ($u_i$) together with reliable estimate of the coded bits blocks ($b_i$),
wherein the method for design an optimized constellation set comprises the steps of:
  selecting a constellation cardinality of $M = 2^m$;
  selecting a splitting of modulation bits $m_i : \Sigma_i m_i = m$ to services;
  selecting a power constraint;
  selecting a target structure for the layer decoders in all the receivers;
  selecting a structure for the mapping $f(b_1, \ldots, b_N)$ characterized by a set of parameters $\alpha$,
  wherein the set of parameters $\alpha$ is selected in order to satisfy the power constraint maximizing the value of $\beta$ as follows:

$\alpha = \text{argmax } \beta : (I_1, \ldots, I_N) \succ \beta(1, \ldots, R^*_N/R^*_1)$ wherein the $I_i$ are the mutual information value associated to the i-th layer, as a function of the system parameters;
  wherein a maximization is performed with a simulated annealing technique; and
  the mutual information values $I_i$ are used to select the required code rates as $r_i \leq I_i/m_i$.

2. The method according to claim 1, wherein the power constraint is selected as peak power constraint according to $$\max_{B_1^m} f(B_1^m) \leq P.$$

3. The method according to claim 1, wherein the power constraint is selected as average power constraint according to $$\frac{1}{M} \sum_{B_1^m} f(B_1^m) \leq P.$$

4. The method according to claim 1, wherein each receiver comprises a pragmatic layer decoder, and wherein in said pragmatic layer decoder no iteration take place between the binary decoder and the detector block, and wherein the target mutual information of the i-th layer is computed as follows:

$$I_i = \sum_{j=n_i}^{n_{i+1}-1} I(B_j; Y_i \mid B_1^{n_i-1})$$

wherein $Y_i = f(B) + N_i$ and $N_i$ is a gaussian random variable with variance computed according to radio link quality associated to the target users of the i-th service.

5. The method according to claim 1, wherein the receivers comprise optimal layer decoders and the target mutual information value of the i-th layer is computed as follows:

$$I_i = I(B_{n_i}^{n_{i+1}-1}; Y_i \mid B_1^{n_i-1})$$

wherein $Y_i = f(B) + N_i$ and $N_i$ is a gaussian random variable with variance computed according to radio link quality associated to the target users of the i-th service.

6. The method according to claim 1, wherein the mapping f is general and the set of parameters $\alpha$ is the list of $M = 2^m$ complex coordinates of the points in the constellation set.

7. The method according to claim 6, wherein a quadrant symmetry is selected for the constellation set, and the set of parameters $\alpha$ is the list of the first M/4 complex coordinates of the constellation set, and the remaining ones are obtained by symmetry as follows:

for all $x \in \left[0, \ldots, \dfrac{M}{4} - 1\right]$ $$f\left(x + \frac{M}{4}\right) = -f^*(x)$$

$$f\left(x + \frac{M}{2}\right) = -f(x)$$

$$f\left(x + \frac{3M}{4}\right) = -f^*(x).$$

8. The method according to claim 1, wherein the mapping f is the superposition of layers with general modulation for each layer $$f(b_1, \ldots, b_N) = \sum_{i=1} \alpha_i f_i(b_i)$$

and the set of parameters defining this structure is, for each layer, the list of $2^{m_i}$ coordinates of the complex points of the constellation set and the complex coefficient $\alpha_i$ used for the linear combination.

9. The method according to claim 1, wherein the mapping f is a superposition of layers, and each layer uses a constellation set obtained as the superposition of binary modulations $$f(b_1, \ldots, b_N) = \Sigma_{i=1}^m p_i(1 - 2B_i)$$

and the set of parameters $\alpha$ defining said structure is the list of m complex coefficients $p_i$.

10. The method according to claim 8, wherein the set of parameters $\alpha$ defining the mapping is reduced by forcing one or more of the constellation sets $f_i$ to some predetermined constellation set.

11. A system wherein the transmitter adopts a constellation set that has been designed according to the method of claim 1.

* * * * *